United States Patent
Chantrel et al.

(10) Patent No.: US 10,156,291 B2
(45) Date of Patent: Dec. 18, 2018

(54) METHOD FOR CONTROLLING A DISENGAGEMENT LIMIT POSITION OF A MOVABLE DOG FOR A MOTOR VEHICLE TRANSMISSION AND CORRESPONDING TRANSMISSION FOR A MOTOR VEHICLE

(71) Applicant: RENAULT s.a.s., Boulogne-Billancourt (FR)

(72) Inventors: Cedric Chantrel, Charentor le Pont (FR); Marco Marsilia, Boulogne Billancourt (FR)

(73) Assignee: RENAULT s.a.s., Boulogne-Billancourt (FR)

(*) Notice: Subject to any disclaimer, the term of this patent is extended or adjusted under 35 U.S.C. 154(b) by 0 days.

(21) Appl. No.: 15/524,840

(22) PCT Filed: Nov. 16, 2015

(86) PCT No.: PCT/FR2015/053073
§ 371 (c)(1),
(2) Date: May 5, 2017

(87) PCT Pub. No.: WO2016/097508
PCT Pub. Date: Jun. 23, 2016

(65) Prior Publication Data
US 2017/0363205 A1   Dec. 21, 2017

(30) Foreign Application Priority Data
Dec. 15, 2014 (FR) .................................... 14 62403

(51) Int. Cl.
*F16H 63/02* (2006.01)
*F16H 61/28* (2006.01)
(Continued)

(52) U.S. Cl.
CPC ............. *F16H 63/02* (2013.01); *F16H 61/28* (2013.01); *F16H 63/30* (2013.01);
(Continued)

(58) Field of Classification Search
CPC .. F16H 63/02; F16H 63/30; F16H 2200/2064; F16H 2063/3093
See application file for complete search history.

(56) References Cited

U.S. PATENT DOCUMENTS 4,019,586 A * 4/1977 Hauser .................... F16D 11/10
   192/48.91
2004/0063541 A1   4/2004 Berger et al.
(Continued)

FOREIGN PATENT DOCUMENTS

DE        102 01 981 A1   8/2002
DE   10 2004 017 794 A    10/2005
DE         1 887 258 A1   2/2008

OTHER PUBLICATIONS

International Search Report dated Feb. 24, 2016, in PCT/FR2015/053073 filed Nov. 16, 2015.
(Continued)

*Primary Examiner* — David J Hlavka
(74) *Attorney, Agent, or Firm* — Oblon, McClelland, Maier & Neustadt, L.L.P.

(57) ABSTRACT

In order to control the disengagement limit position of a movable dog relative to a fixed dog of a motor vehicle transmission, the following steps are implemented: acquiring position values of the movable dog; detecting an abutment position of the movable dog against the fixed dog for a predefined period; and calculating the limit position from the position value of the movable dog in abutment against the fixed dog.

10 Claims, 3 Drawing Sheets

(51) Int. Cl.
*F16H 63/30* (2006.01)
*F16H 61/00* (2006.01)

(52) U.S. Cl.
CPC ............... *F16H 2061/0087* (2013.01); *F16H 2061/283* (2013.01); *F16H 2063/3093* (2013.01); *F16H 2200/2064* (2013.01); *F16H 2306/46* (2013.01); *F16H 2342/02* (2013.01)

(56) References Cited

U.S. PATENT DOCUMENTS

| | | | |
|---|---|---|---|
| 2007/0208480 A1 | 9/2007 | Disch-Simon et al. | |
| 2012/0065014 A1* | 3/2012 | Puiu ...................... | B60K 6/445 |
| | | | 475/5 |
| 2016/0003351 A1* | 1/2016 | Park ........................ | F16H 3/54 |
| | | | 475/153 |
| 2016/0053877 A1* | 2/2016 | Park ...................... | F16H 37/043 |
| | | | 74/325 |

OTHER PUBLICATIONS

French Search Report dated Aug. 3, 2015, in French Patent Application 1462403 filed Dec. 15, 2014.

* cited by examiner

METHOD FOR CONTROLLING A
DISENGAGEMENT LIMIT POSITION OF A
MOVABLE DOG FOR A MOTOR VEHICLE
TRANSMISSION AND CORRESPONDING
TRANSMISSION FOR A MOTOR VEHICLE

BACKGROUND

The invention essentially concerns transmissions for motor vehicles and, in particular although not exclusively, hybrid transmissions for motor vehicles including, on the one hand, an internal combustion drive engine and, on the other hand, an electric motor.

It should be noted, however, that the invention is not restricted to a suchlike field of application and essentially relates to gearboxes for motor vehicles comprising an actuating system acting on a movable dog engaging with a fixed dog when changing gear.

In gearboxes of this type, the actuating system uses an assistance system comprising a means of storing energy which ensures the storage of the energy derived from the actuating system when the teeth of the movable dog come into abutment against the teeth of the fixed dog for restoring it when dog-clutching or dog-declutching again becomes possible.

The displacement of the movable dog relative to the fixed dog is governed by a control system of the gearbox.

One of the problems associated with this type of gearbox is the need to satisfy oneself, as reliably as possible, that when the control system considers that the movable dog is in a dog-declutched or disengagement position, the movable dog is effectively in that position. In the event of an error, that is to say if the movable dog is in engagement with the fixed dog when the control system considers that the movable dog is in the disengagement position, the vehicle may be subjected to unintentional accelerations or decelerations.

In order to do this, the control system must have available the actual value of the disengagement limit position of the dogs, on the basis of which an increase in the displacement of the movable dog will cause a disengagement of the teeth of the dogs.

Reference may be made to documents FR 2 977 198 and FR 2 973 299, which describe a hybrid transmission architecture for motor vehicles and a corresponding method of control which utilize coupling systems, more particularly dog systems, in order to bring a primary shaft into engagement with a rotor of an electric motor or with idler sprockets for the purpose of transmitting the driving energy to the wheels by means of a differential. However, as indicated previously, in this type of transmission, the control system of the gearbox is not able to ensure, in a reliable manner, the position of disengagement of the movable dogs.

BRIEF SUMMARY

The aim of the invention is thus to address this disadvantage and, more particularly, to diagnose any deviation in the disengagement limit position of movable dogs over the lifetime of the vehicle, more particularly with a view to enabling this position to be corrected.

The invention thus proposes a method for controlling the disengagement limit position of a movable dog relative to a fixed dog of a motor vehicle transmission, which includes the following steps:
  acquiring position values of the movable dog;
  detecting an abutment position of the movable dog against the fixed dog for a predefined period, and
  calculating said limit position from the position of the movable dog in abutment against the fixed dog.

In addition, in one embodiment, the difference between the calculated limit position and a calibrated disengagement limit position is calculated, and the result of said difference calculation is compared with a threshold value for the detection of any deviation from the disengagement limit position.

Advantageously, the position values of the movable dog are processed in such a way as to apply a delay corresponding to a delay in the implementation of an actuator.

As a variant, the position values of the movable dog are obtained from a measurement sensor.

It is possible to compare the position of the movable dog with a threshold for the detection of the engagement position, and the next step is to proceed to calculate said limit position if the dog has been displaced into the engagement position.

According to another characterizing feature of the control method according to the invention, the abutment position of the dog is detected on the basis of a calculation of the filtered derivative of the position of the movable dog, and on the basis of a comparison of said filtered derivative with a threshold value for the detection of an abutment.

It is possible, more particularly, to detect an abutment position if the filtered derivative is below said threshold value for said specified period.

The invention also has as its object, according to a second aspect, a transmission for a motor vehicle, comprising an assembly of at least one movable dog relative to a corresponding assembly of fixed dogs under the action of an actuator.

Said transmission comprises means for controlling a disengagement limit position of the movable dog relative to the fixed dog, comprising means for acquiring position values of the movable dog, means for detecting an abutment position of the movable dog against the fixed dog for a predefined period and means of calculation for calculating said disengagement limit position from the position value of the movable dog in abutment against the fixed dog.

Thus, by calculating the limit value for the disengagement position of the movable dog on the basis of the position value of the movable dog in abutment against the fixed dog, when a set of criteria are satisfied, more particularly as regards the detection of the abutment position of the movable dog against the fixed dog, it is possible to ensure that the calculated limit position corresponds closely to a disengagement limit position, on the basis of which a displacement of the movable dog, in the direction of the disengagement, caused by the actuating mechanism, brings about a disengagement of the movable dog.

BRIEF DESCRIPTION OF THE DRAWINGS

Other aims, characterizing features and advantages of the invention will emerge from a perusal of the following description, which is provided solely by way of non-exhaustive example and is made with reference to the accompanying drawings, in which.

DETAILED DESCRIPTION

Figure 1:
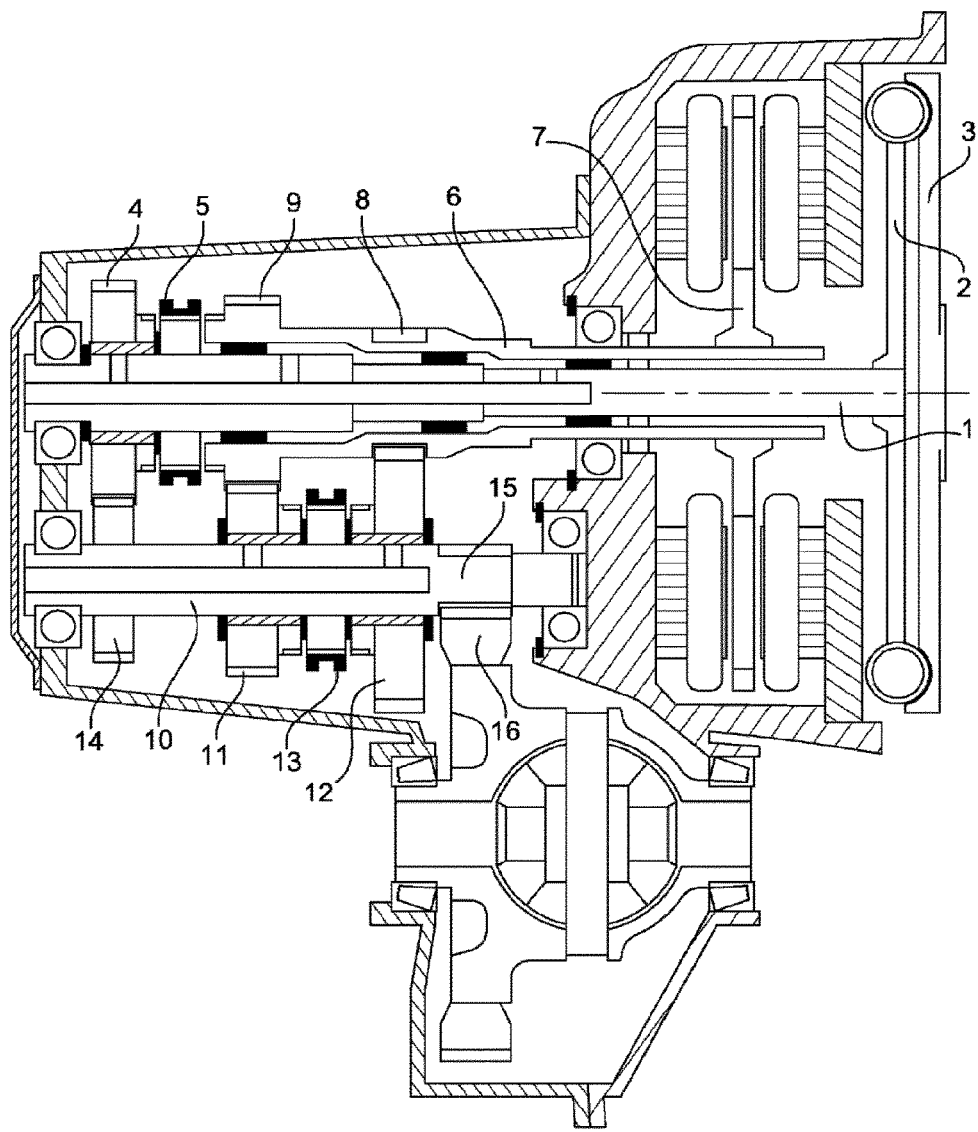
FIG. 1 is a diagram of the architecture of a motor vehicle transmission.

Reference is initially made to FIG. 1, which illustrates the general architecture of a motor vehicle transmission, constituted in this case by a hybrid transmission for a motor vehicle comprising, on the one hand, an internal combustion drive engine and, on the other hand, an electric motor.

The transmission illustrated in FIG. 1 includes a solid primary shaft 1 connected directly by means of a filtration system (shock-absorbing hub, "damper", dual-mass flywheel or other) 2 to the flywheel 3 of an internal combustion engine (not illustrated).

The solid shaft 1 carries an idler gear 4 capable of being connected to the shaft 1 by a first dog coupling system 5. A primary hollow shaft 6 is attached to the rotor of an electric motor 7. The hollow shaft 6 carries two fixed gears 8 and 9 and may be attached to the primary solid shaft by means of the coupling system 5. A secondary shaft 10 carries two idler gears 11 and 12, which may be attached to the primary shaft by means of a second dog coupling system 13. The secondary shaft 10 likewise carries a fixed gear 14 and a step-down gear 15 towards a differential 16 attached to the wheels (not illustrated) of the vehicle.

The first means of coupling 5 adopts at least three positions, in which:
- the internal combustion engine is uncoupled from the drive chain connecting the electric motor 7 to the wheels (position 1),
- the internal combustion engine drives the wheels with or without the assistance of the electric motor (position 2), and
- the internal combustion engine and the electric motor 7 are coupled in a manner such as to add together their respective torques in the direction of the wheels (position 3).

Figure 2:
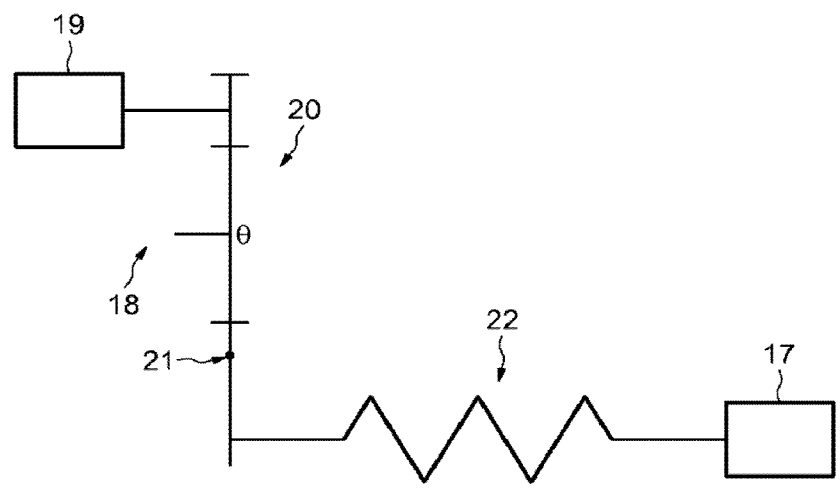
FIG. 2 illustrates in a schematic manner the principle of the chain of actuation of a gear change.

With reference to FIG. 2, which illustrates the principle of the sequence of actuation of a gear change, the coupling systems such as 5 and 13 of a transmission for a motor vehicle conventionally use a movable dog 17, of which the displacement is governed by an actuation system 18 comprising an electric motor 19 which brings about the displacement in translation of the movable dog 17 relative to a fixed dog by means of a reduction gear 20, a movement transformation device 21 and an assistance mechanism 22 comprising a means for storing energy, in this case a spring.

Figure 3:
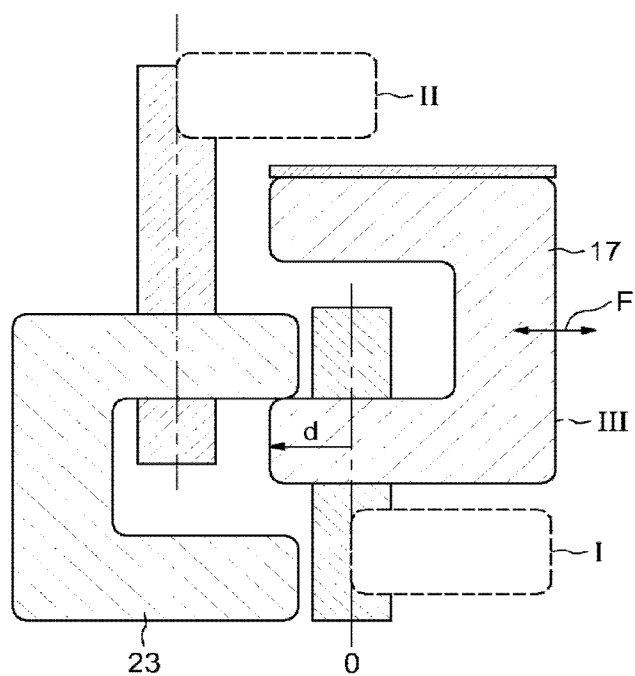
FIG. 3 is a basic diagram showing the different positions of the movable dog relative to the fixed dog.

Reference is now made to FIG. 3, which shows various respective positions of the movable dog 17 relative to a fixed dog 23.

As mentioned previously, the movable dog 17, which is constituted here, for example, by a dog having teeth of rectangular form which interact with teeth of corresponding form produced on the fixed dog 23, is displaced in translation under the action of the method of actuation 18, as indicated by the arrow F, between a neutral position I, in which the movable dog is totally disengaged from the fixed dog and an engaged position II, in which the teeth of the movable dog mesh with the teeth of the fixed dog, passing through an intermediate position III corresponding to a disengagement limit position, in which the movable dog is in engagement with the fixed dog, and in which the subsequent phase of displacement of the movable dog is a position of disengagement or dog-declutching of the movable dog.

It should be noted that, from a disengaged position, when the movable dog is displaced in the direction of dog-clutching, that is to say from right to left in FIG. 3, and when the fixed and movable dogs are mutually offset in such a way that the teeth do not come into abutment, the movable dog moves linearly as far as position II.

Conversely, when the teeth of the movable dog come into abutment against the teeth of the fixed dog, the movable dog remains fixed and the spring 22 of the energy storage device is compressed as it accumulates the mechanical energy produced by the actuating system for restoring it once more when dog-clutching becomes possible.

In any event, the transmission control system integrates a control algorithm which takes into account the disengagement limit position. It is, in fact, necessary, when the transmission control system governs the position of the movable dog in such a way that it is in a disengaged position and therefore considers that the dogs are dog-declutched, for the movable dog to be effectively disengaged.

Figure 4:
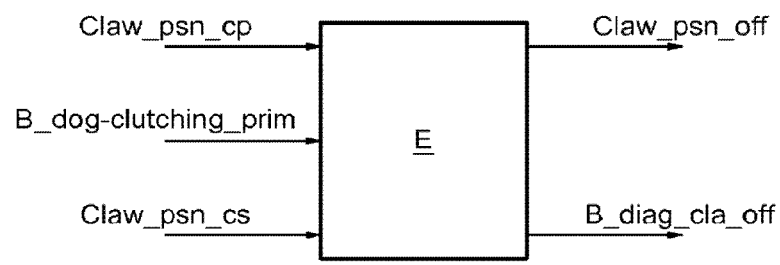
FIG. 4 illustrates in a schematic manner the change in the disengagement limit position of the movable dog.

The control system thus incorporates a step E (FIG. 4) comprising hardware and software suitably programmed to control the disengagement limit position, and to identify any deviation from this disengagement threshold over the lifetime of the transmission in order, more particularly, to correct this disengagement threshold.

Said control step E receives, as its input, a setpoint value for the position of the movable dog Claw_psn_sp, a dog-clutching request signal B_dog-clutching_prim and a consolidated value for the position of the dog Claw_psn_csn and provides, as its output, a consolidated disengagement threshold value Claw_psn_off and a Boolean value indicating a deviation from the disengagement threshold relative to a reference threshold value B_diag_claw_off.

In other words, the step E calculates, from the input data, the distance d (FIG. 3) between the neutral position "0" and the start of the engaged position and compares this distance with a position that has been calibrated in the factory, in order to detect a deviation from the disengagement threshold, including with a margin of safety.

Figure 5:
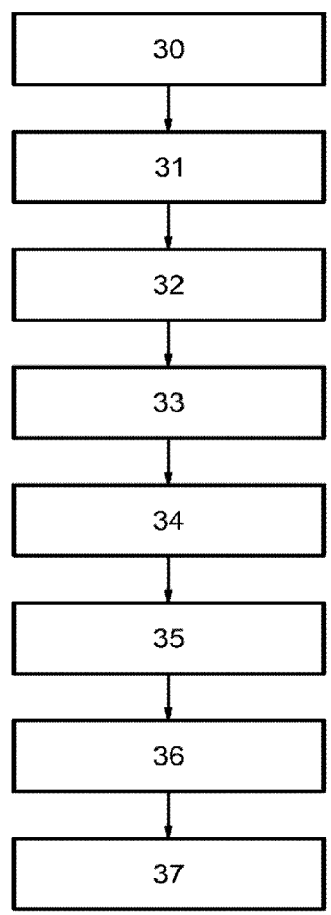
FIG. 5 illustrates the principal phases of a control method according to the invention.

A description will now be given, with reference to FIG. 5, of the principal phases of the control method implemented by step E of the control system for the box, in order to determine the disengagement limit value of the movable dog.

It should be noted, in the first instance, that the setpoint value for the position of the dog Claw_psn_cp may be provided by the use of an appropriate sensor.

It may likewise be deduced from the position of the actuating system 18. Nevertheless, such a gross value must be corrected or consolidated in such a way as to take into account the delay between the application of a setpoint for the position and the effective displacement of the movable dog.

A delayed setpoint value for the position of the movable dog Claw_psn_sp_delay is thus defined during the first step 30, such as:

$$\text{Claw\_}psn\_sp\text{-delay}(t) = 1000 * \text{Claw\_}psn\_sp(t - t\_\text{delay})$$
$$\text{with } 0 < t\_\text{delay} \leq 1 \text{ second}$$

where t_delay indicates the delay due to the actuation of the actuating system.

During the following step 31, it is detected whether a request for dog-clutching has been made, or, in other words, whether the setpoint value for the position of the movable dog is greater than a threshold setpoint value for the engagement position.

In other words, a Boolean value B_claw_psn_sp_delay_ok is defined, indicating that the delayed setpoint for the position of the dog is greater than the threshold setpoint for the engagement position Threshold eng, such as:

B_claw_*psn_sp*_delay_*ok*=1 if |Claw_*psn_sp*_delay(*t*)|≥Threshold_*eng* with 4.5≤6 mm During the following steps 32 and 33, it is detected whether the movable dog comes into abutment against the fixed dog.

In other words, during step 32, a variable Claw_psn_cs_dot_fil is defined, such as:

Claw_*psn_cs_dot_fit*=Deriv_*Fil*(1000*Claw_*psn_cs*)

where Deriv_Fil is a filtered derivative having a time constant between 10 ms and 500 ms.

During step 33, a Boolean variable B_claw_psn_cs_dot_fil_temp is defined, indicating that the above filtered derivative is lower than the threshold Threshold_der, for which it is considered that the sliding gear is locked in a tooth-on-tooth position, such as:

B_claw_*psn_cs_dot_fil*_temp=1 if |Claw_*psn_cs_dot_fil*|≤Threshold_*der* with 1≤Threshold_*der*≤5 mm/s.

In other words, if the movable dog comes into abutment against a tooth, the value for the displacement of the movable dog is canceled out, such that its derivative approaches zero during the threshold value Threshold_der.

During the following step 34, a Boolean variable B_claw_psn_cs_dot_fil_ok is defined, such as:

B_claw_*psn_cs_dot_fil_ok*=1 if B_claw_*psn_dot_fil*_temp=1 for tempo_confir with 0<tempo_confir≤100 ms.

In other words, it is verified that the movable dog remains locked for a sufficient period tempo_confir of up to 100 ms.

During the following step 35, it is ensured that a certain number of predefined criteria are satisfied, and the next step is to proceed to an actual calculation of the disengagement limit position.

A Boolean variable B_trig_threshold_diseng is defined, such as:

B_trig_threshold_diseng=1 if B_dog-clutching_prim=1

AND B_claw_*psn_sp*_delay_*ok*=1

AND B_claw_*psn_cs_dot_fil_ok*=1

During this phase, a Boolean variable is defined which is positioned at "1" if it has been determined, during earlier steps, that the actuating system has been activated, that a request for disengagement has actually been formulated, and that the movable dog is in a position of abutment, including for a predetermined period.

If that is the case, the next step is to proceed to calculate the disengagement threshold value Claw_psn_off (step 36).

Claw_psn_off is then defined by the following equation:

Claw_*psn*_off=Claw_*psn_cs*(*t*_trig)

where t_trig is the moment when B_trig_threshold_diseng passes from the value 0 to 1.

In other words, the calculated limit value corresponds to the position of the movable dog in abutment against the fixed dog, that is to say the setpoint value of the consolidated position of the movable dog at the moment when the Boolean variable calculated in the course of the preceding step 35 passes to level 1.

During the following step 37, a detection is made of the possible deviation from the disengagement threshold relative to a reference threshold value by calculating a Boolean variable B_diag_claw_off.

B_diag_claw_off is then defined by the following equation:

B_diag_claw_off=1 if |Claw_*psn*_off_factory|>threshold_deviation where Claw_psn_off_factory is the disengagement threshold set in the factory, and 0<threshold_deviation≤1 mm.

If such a deviation has been detected, it is possible either to update the new limit value within the control system for the transmission or to activate an alarm with the intention of initiating a maintenance phase.

The invention claimed is:

1. A method for controlling a disengagement limit position of a movable dog relative to a fixed dog of a motor vehicle transmission, the movable dog being movable in translation relative to the fixed dog, the method comprising:
    acquiring position values of the movable dog as the movable dog moves in translation relative to the fixed dog;
    detecting an abutment position of the movable dog against the fixed dog for a predefined period;
    calculating said disengagement limit position from the position value of the movable dog in abutment against the fixed dog.

2. The method as claimed in claim 1, further comprising calculating a difference between the calculated disengagement limit position and a calibrated disengagement limit position and a result of said difference calculation is compared with a threshold value to detect any deviation from the calculated disengagement limit position.

3. The method as claimed in claim 1, wherein the position values of the movable dog are processed in such a way as to apply a delay corresponding to a delay in implementation of an actuator.

4. The method as claimed in claim 1, wherein the position values of the movable dog are obtained from a measurement sensor.

5. The method as claimed in claim 1, wherein the position of the movable dog is compared with a threshold for a detection of an engagement position, and then said disengagement limit position is calculated when the movable dog has been displaced into the engagement position.

6. The method as claimed in claim 1, wherein the abutment position of the movable dog is detected on the basis of a calculation of a filtered derivative of the position of the movable dog, and wherein said filtered derivative is compared with a threshold value for the detection of an abutment.

7. The method as claimed in claim 6, wherein the abutment position is detected when the filtered derivative is below said threshold value for said predefined period.

8. A transmission for a motor vehicle, comprising:
    an assembly of at least one dog that is movable in translation relative to a corresponding assembly of fixed dogs under action of an actuator;
    means for controlling a disengagement limit position of the movable dog relative to the fixed dog;
    means for acquiring position values of the movable dog when the movable dog moves in translation relative to the fixed dog;
    means for detecting an abutment position of the movable dog against the fixed dog for a predefined period; and means of calculation for calculating said disengagement limit position from the position value of the movable dog in abutment against the fixed dog.

9. The method as claimed in claim 2, further comprising, after the calculating the difference, updating the calibrated disengagement limit position to be the calculated disengagement limit position when the deviation has been detected.

10. The method as claimed in claim 2, further comprising, after the calculating the difference, activating an alarm when the deviation has been detected.

* * * * *